P. GRIFFIN.
APPARATUS FOR THE MANUFACTURE OF SPIRITS.
No. 170,254. Patented Nov. 23, 1875.
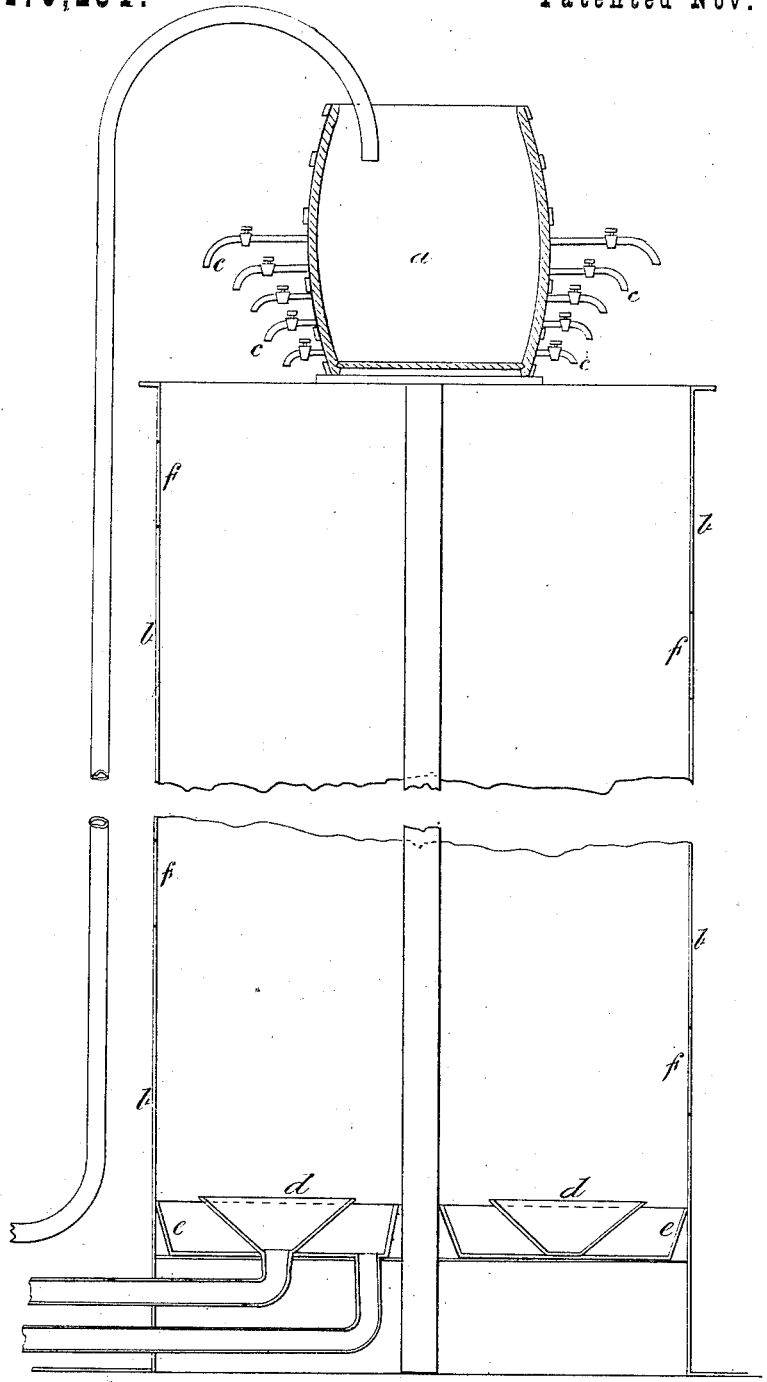

UNITED STATES PATENT OFFICE.

PATRICK GRIFFIN, OF CORK, IRELAND.

IMPROVEMENT IN APPARATUS FOR THE MANUFACTURE OF SPIRITS.

Specification forming part of Letters Patent No. 170,254, dated November 23, 1875; application filed June 5, 1874.

*To all whom it may concern:*

Be it known that I, PATRICK GRIFFIN, of the city and county of Cork, Ireland, have invented an Improvement in the Manufacture of Spirits, and apparatus for the same, of which the following is a specification:

My invention consists in an improved apparatus for the manufacture of whisky or other analogous spirit, so as to eliminate from it the injurious properties of its fusel-oil and other impurities.

Whisky, as hitherto manufactured and delivered for consumption by the distiller, has contained a certain proportion of fusel-oil and other impurities, which render the spirit not merely unfit for immediate consumption, but injurious in a high degree, although spirit so contaminated is constantly sold and consumed by the lower classes and others, producing very injurious results. It has heretofore been necessary to keep the spirit some years to allow of its undergoing that natural process of purification which time effects in alcoholic liquors, whereas, by my invention, I am enabled in a very short time to effect what has hitherto required the lapse of years—namely, to deprive the spirit, to a great extent, of its injurious qualities, whereby a great improvement in the manufacture of spirits is effected.

According to my invention the spirit is purified by submitting it in a divided state to the action of atmospheric air; but, that the invention may be fully understood, I will proceed to describe means pursued by me in carrying the same into effect.

The drawing represents a sectional view of apparatus arranged to carry out my improvements, the middle part being removed to save length in the drawing.

The spirit to be operated upon is pumped or otherwise raised into a vat, *a*, or other convenient receptacle, placed at or near the top of a hollow column, *b*, or tower of considerable elevation, say fifty feet high. The said vat or receptacle is provided with a number of pipes and cocks or taps, *c*, placed to adjust the extent of opening through them so that the spirit may fall in drops in the said column or tower. The cocks are turned on only just enough to allow the spirit to drip therefrom, in order that as it falls through the air contained in the column *b* in a divided state it may become fully acted on by such air, and thereby purified. Receptacles *d* and *e* are provided at the lower part of the column *b*, the one surrounding the other—the central one, *d*, being that for the purified spirit, and the other, *e*, for the impurities disengaged therefrom in its descent. I find that if the diameter of the central receptacle *d* is about equal to two-thirds of the diameter of the column *b* it will answer the purpose. *f f* are windows or other openings in the column or tower *b*, for regulating the admission of air to act on the spirit as it descends in a divided state from the reservoir or supply.

Having now described the nature of the invention and the manner of performing the same, I would have it understood that what I claim as my invention is—

The herein-described apparatus, consisting of a supply-vessel, *a*, with outlet-passages therefrom, provided with cocks for regulating the dropping of the liquid drop by drop, surmounting and combined with a high column or tower, *b*, and a receiver at the bottom of the tower, as and for the purposes set forth.

PATRICK GRIFFIN.

Witnesses:
JOHN ROBEY, Jr.,
GEO. T. SMALLWOOD, Jr.